US010671436B2

(12) United States Patent
Chiba et al.

(10) Patent No.: US 10,671,436 B2
(45) Date of Patent: Jun. 2, 2020

(54) LAZY DATA LOADING FOR IMPROVING MEMORY CACHE HIT RATIO IN DAG-BASED COMPUTATIONAL SYSTEM

(71) Applicant: INTERNATIONAL BUSINESS MACHINES CORPORATION, Armonk, NY (US)

(72) Inventors: Tatsuhiro Chiba, Tokyo (JP); Takeshi Yoshimura, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 209 days.

(21) Appl. No.: 15/969,375

(22) Filed: May 2, 2018

(65) Prior Publication Data
US 2019/0340016 A1    Nov. 7, 2019

(51) Int. Cl.
G06F 9/50    (2006.01)
G06F 9/48    (2006.01)
G06F 12/121    (2016.01)
G06F 12/0895    (2016.01)
G06F 16/22    (2019.01)
G06F 16/901    (2019.01)

(52) U.S. Cl.
CPC .......... *G06F 9/5033* (2013.01); *G06F 9/4881* (2013.01); *G06F 9/5038* (2013.01); *G06F 12/0895* (2013.01); *G06F 12/121* (2013.01); *G06F 16/2282* (2019.01); *G06F 16/9024* (2019.01); *G06F 2212/1021* (2013.01); *G06F 2212/608* (2013.01)

(58) Field of Classification Search
CPC .... G06F 9/4881; G06F 9/5033; G06F 9/5038; G06F 16/228; G06F 16/9024; G06F 12/0895; G06F 12/121; G06F 2212/1021; G06F 2212/608
See application file for complete search history.

(56) References Cited

U.S. PATENT DOCUMENTS 10,372,685 B2 * 8/2019 Vincent ................. G06F 16/182
2011/0099553 A1 * 4/2011 Agarwal ............... G06F 9/4881
718/105

(Continued)

FOREIGN PATENT DOCUMENTS

CN    103631730    4/2016

*Primary Examiner* — Jacob D Dascomb
(74) *Attorney, Agent, or Firm* — Tutunjian & Bitetto, P.C.; Vazken Alexanian

(57) ABSTRACT

A method is provided for improving a hit ratio of a buffer cache in a system in which vertices of a DAG have tasks that generate intermediate data stored in the buffer cache. The method tracks (i) a buffer cache usage by vertices that have finished running and (ii) a current available buffer cache space. Responsive to a new task being runnable and having dependent parent vertices, the method estimates a total buffer cache usage of current running vertices based on a partial result of the current running vertices. Responsive to the estimate exceeding current available buffer cache space, the method (i) selects a vertex having a most amount of intermediate data stored in the buffer cache for its dependent parent vertices, and (ii) increases a priority of the tasks in the selected vertex to obtain prioritized tasks. The method executes the prioritized tasks earlier than other remaining runnable tasks.

20 Claims, 9 Drawing Sheets

(56) References Cited

U.S. PATENT DOCUMENTS

2012/0158816 A1    6/2012   Choi et al.
2016/0098662 A1    4/2016   Voss et al.
2018/0067861 A1*   3/2018   Yang ..................... G06F 3/061

* cited by examiner

LAZY DATA LOADING FOR IMPROVING MEMORY CACHE HIT RATIO IN DAG-BASED COMPUTATIONAL SYSTEM

BACKGROUND

Technical Field

The present invention generally relates to information processing, and more particularly to lazy data loading for improving memory cache hit ratio in a DAG-based computational system.

Description of the Related Art

Directed Acyclic Graph (DAG) based computational systems are widely used in many runtimes such as Spark and Tez®. Each vertex executes some tasks and produces intermediate data for a dependent vertex (successor vertex). Many DAG schedulers try to run independent vertices first and do not change scheduling order at runtime. Typically, each intermediate vertex writes intermediate data to persistent storage. Data loading vertex first is generally a good approach if there exists enough slots, because Input/Output (I/O) is a bottleneck in most cases.

Some type of workloads (e.g., outer join) generate a huge amount of intermediate data at each vertex. It is difficult to predict how much data will be generated before running. If loaded data is too big for available memory capacity, the past loaded data in another vertex will be evicted from memory (i.e., evicted from the Operating System (OS) buffer cache). As a result, the data has to be loaded again from persistent storage when starting a dependent vertex. Hence, there is a need for a data loading approach to improve efficiency in DAG-based computing systems.

SUMMARY

According to an aspect of the present invention, a computer-implemented method is provided for improving a hit ratio of a buffer cache in a Directed Acyclic Graph (DAG)-based computation system in which vertices of a DAG have tasks that generate intermediate data stored in the buffer cache. The method includes tracking (i) a buffer cache usage by the vertices that have finished running and (ii) a current available buffer cache space. The method further includes responsive to a new one of the tasks being tagged as runnable, checking whether the new one of the tasks has one or more dependent parent vertices. The method also includes responsive to the new one of the tasks having the one or more dependent parent vertices, generating an estimate of a total buffer cache usage of any current running ones of the vertices based on a partial result of the current running ones of the vertices. The method additionally includes responsive to the estimate being greater than the current available buffer cache space, (i) selecting a vertex, from the current running vertices, that has a most amount of intermediate data stored in the buffer cache for its one or more dependent parent vertices, and (ii) increasing a priority of the tasks in the selected vertex that are in a run tasks queue to obtain prioritized tasks. The method further includes executing, by a processor of the DAG-based computation system, the prioritized tasks in the selected vertex earlier than other remaining runnable tasks having an amount of the intermediate data stored in the buffer cache being less than that of the selected vertex and less than a threshold amount.

According to another aspect of the present invention, a computer program product is provided for improving a hit ratio of a buffer cache in a Directed Acyclic Graph (DAG)-based computation system in which vertices of a DAG have tasks that generate intermediate data stored in the buffer cache. The computer program product includes a computer readable storage medium having program instructions embodied therewith. The program instructions are executable by the DAG-based computation system to cause the DAG-based computation system to perform a method. The method includes tracking (i) a buffer cache usage by the vertices that have finished running and (ii) a current available buffer cache space. The method further includes responsive to a new one of the tasks being tagged as runnable, checking whether the new one of the tasks has one or more dependent parent vertices. The method also includes responsive to the new one of the tasks having the one or more dependent parent vertices, generating an estimate of a total buffer cache usage of any current running ones of the vertices based on a partial result of the current running ones of the vertices. The method additionally includes responsive to the estimate being greater than the current available buffer cache space, (i) selecting a vertex, from the current running vertices, that has a most amount of intermediate data stored in the buffer cache for its one or more dependent parent vertices, and (ii) increasing a priority of the tasks in the selected vertex that are in a run tasks queue to obtain prioritized tasks. The method further includes executing, by a processor of the DAG-based computation system, the prioritized tasks in the selected vertex earlier than other remaining runnable tasks having an amount of the intermediate data stored in the buffer cache being less than that of the selected vertex and less than a threshold amount.

According to yet another aspect of the present invention, a Directed Acyclic Graph (DAG)-based computation system is provided. The system includes a memory for storing a DAG having vertices that include tasks that generate intermediate data. The system further includes a buffer cache for storing the intermediate data. The system also includes a processor, operatively coupled to the memory and the buffer cache. The processor runs program code to track (i) a buffer cache usage by the vertices that have finished running and (ii) a current available buffer cache space. The processor further runs program code to, responsive to a new one of the tasks being tagged as runnable, check whether the new one of the tasks has one or more dependent parent vertices. The processor also runs program code to, responsive to the new one of the tasks having the one or more dependent parent vertices, generate an estimate of a total buffer cache usage of any current running ones of the vertices based on a partial result of the current running ones of the vertices. The processor additionally runs program code to, responsive to the estimate being greater than the current available buffer cache space, (i) select a vertex, from the current running vertices, that has a most amount of intermediate data stored in the buffer cache for its one or more dependent parent vertices, and (ii) increase a priority of the tasks in the selected vertex that are in a run tasks queue to obtain prioritized tasks. The processor further runs program code to execute the prioritized tasks in the selected vertex earlier than other remaining runnable tasks having an amount of the intermediate data stored in the buffer cache being less than that of the selected vertex and less than a threshold amount.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to lazy data loading for improving memory cache hit ratio in a DAG-based computational system.

In an embodiment, the present invention optimizes an Operating System (OS) buffer cache hit ratio in a DAG based computational system. By checking each vertex output data size and estimating an amount of used OS buffer cache at runtime, the present invention dynamically changes scheduled tasks in the DAG.

In an embodiment, the present invention focuses on improving buffer cache hit ratio of current running tasks by changing task scheduling order dynamically within tasks of independent vertexes.

Intermediate results are stored in the buffer cache memory for a time period but are evicted periodically responsive to the amount of available free buffer cache space (e.g., being less than a threshold amount).

Hence, in an embodiment, the present invention utilizes cached result of dependent tasks in buffer cache for current runnable tasks as much as possible. In this way, the cache hit ratio is improved.

In an embodiment, the present invention does not change vertex level execution order with static information, but instead changes runnable task level execution order in independent vertexes with dynamic information.

Figure 1:
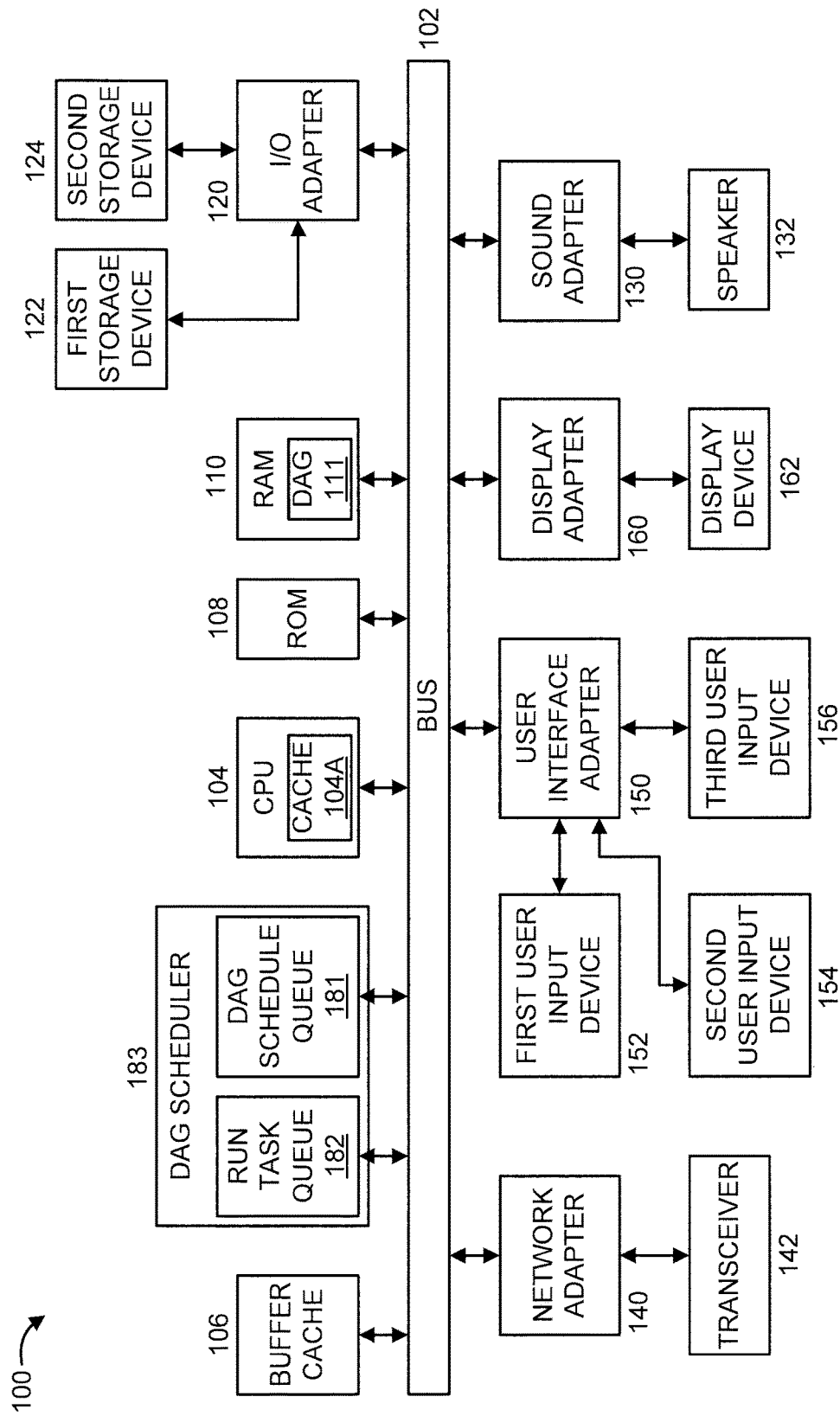
FIG. 1 is a block diagram showing an exemplary DAG-based computer processing system to which the present invention may be applied, in accordance with an embodiment of the present invention.

FIG. 1 is a block diagram showing an exemplary DAG-based computer processing system 100 to which the present invention may be applied, in accordance with an embodiment of the present invention. In an embodiment, DAG-based computer processing system 100 can be configured to process huge amounts of data on one or multiple nodes.

The processing system 100 includes at least one processor (CPU) 104 operatively coupled to other components via a system bus 102. An operating system buffer cache (hereinafter "buffer cache" in short) 106, a Read Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

The RAM 110 stores information for performing DAG operations and can include DAG 111. The buffer cache 106 is used to support the DAG operations including, but not limited to, storing intermediate results for the DAG operations. In an embodiment, the CPU 104 includes its own cache(s) 104A. In an embodiment, CPU 104 can be a multiple core processor, where each core is implemented as a processing node for processing DAG operations. In an embodiment, each core of the CPU 104 can include its own cache. A DAG schedule queue 181 and a DAG run task queue 182, included in a DAG scheduler 183, are used to dynamically schedule and run tasks, respectively, for vertices of the DAG 111.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
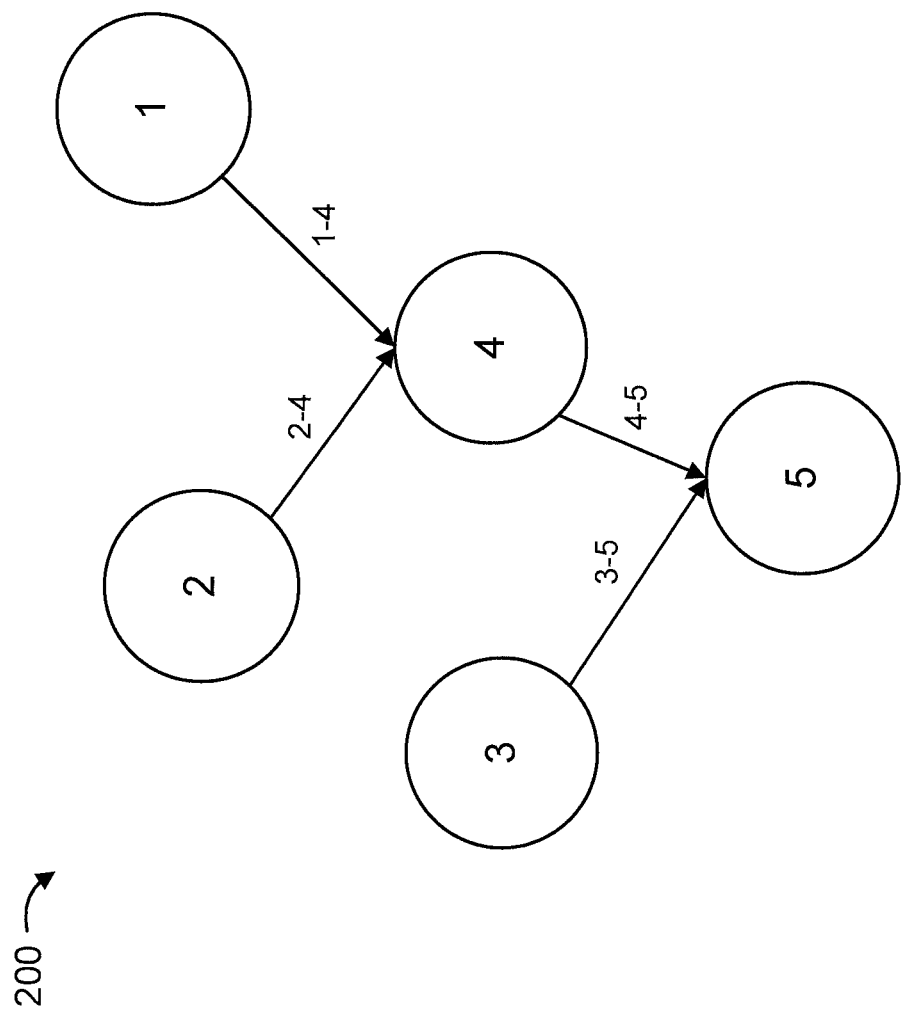
FIG. 2 is a block diagram showing an exemplary Directed Acyclic Graph (DAG) to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 6:
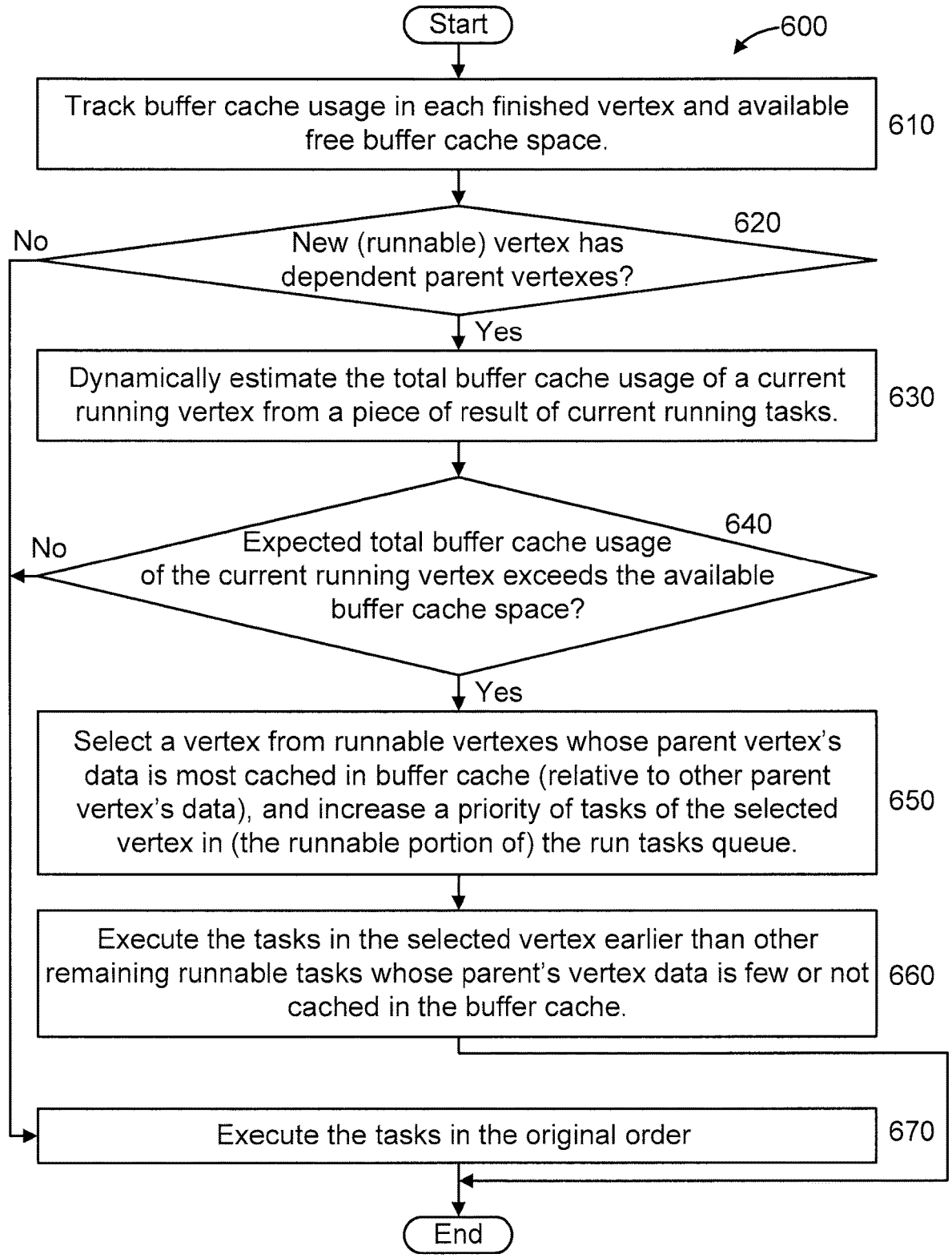
FIG. 6 is a flow diagram showing a method for data loading for improving memory cache hit ratio in a DAG-based computational system, in accordance with an embodiment of the present invention.
Figure 7:
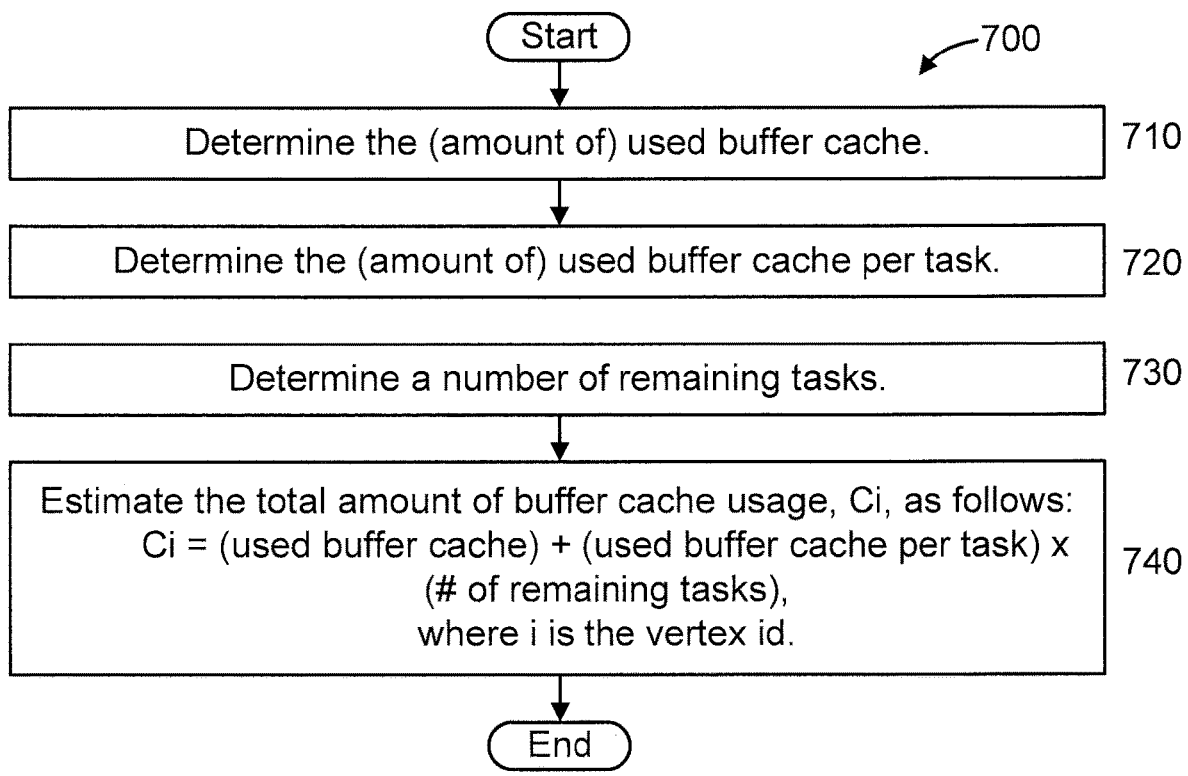
FIG. 7 is a flow diagram showing an exemplary method for estimating a total amount of buffer cache usage of a current running vertex based on a fragmented (partial) task result, in accordance with an embodiment of the present invention.

Also, it is to be appreciated that processing system 100 may perform at least part of the methods described herein including, for example, at least part of method 600 of FIG. 6 and/or at least part of method 700 of FIG. 7.

FIG. 2 is a block diagram showing an exemplary Directed Acyclic Graph (DAG) 200 to which the present invention can be applied, in accordance with an embodiment of the present invention.

The DAG 200 includes vertices 1 through 5 (shown as circles encompassing a respective integer from 1 to 5) and edges 1-4, 2-4, 3-5, and 4-5 (shown as lines connecting the aforementioned circles). Each vertex can include multiple tasks (e.g., 1024 tasks in vertex 1, 200 tasks in vertex 4, and so forth).

Most DAG schedulers try to run independent vertices first and do not change scheduling order. For example, the Spark DAG scheduler always launches vertices with the order shown in FIG. 2. However, such a rigid scheduling approach can lead to increased buffer cache misses. The present invention overcomes this problem by dynamically changing task scheduling order within tasks of independent vertices.

The tasks in a vertex can apply various functions to portions of data. The functions can include, but are not limited to, the following: data load; filter; search; join; and so forth.

In an embodiment, DAG-based computer processing system 100 can involve the following input and output. In an embodiment, for the sake of illustration, the input can involve, for example, but is not limited to, raw data (only leaf nodes such as vertices 1, 2, and 3), and intermediate result of each vertex (e.g., vertices 4 and 5). In an embodiment, for the sake of illustration, the output can involve, for example, but is not limited to, intermediate result (vertices 1, 2, 3, and 4); or a final result (vertex 5).

A vertex may have dependent vertexes. For the sake of illustration, the DAG 200 is configured such that each of vertices 1, 2, 3 has no dependent vertex, while vertex 4 depends on vertices 1 and 2.

A vertex often persists its computational intermediate result to files because the generated intermediate result is huge, and it is difficult to keep the intermediate result in memory before forwarding the intermediate result to later dependent vertexes, so intermediate results are also kept in buffer cache.

The system 100 is configured to improve the buffer cache hit ratio of current running tasks by changing task scheduling order dynamically within the tasks of independent vertexes. The task scheduling order is dynamically changed by the DAG scheduler 183.

DAG 200 will be used further herein for the sakes of illustration and clarity in describing various aspects and features of the present invention. However, it is to be appreciated that the present invention can be applied to DAGs having other configurations (e.g., other numbers of vertices, other numbers of edges, other dependencies, and so forth) than that shown in FIG. 2, given the teachings of the present invention provided herein, while maintaining the spirit of the present invention.

Figure 3:
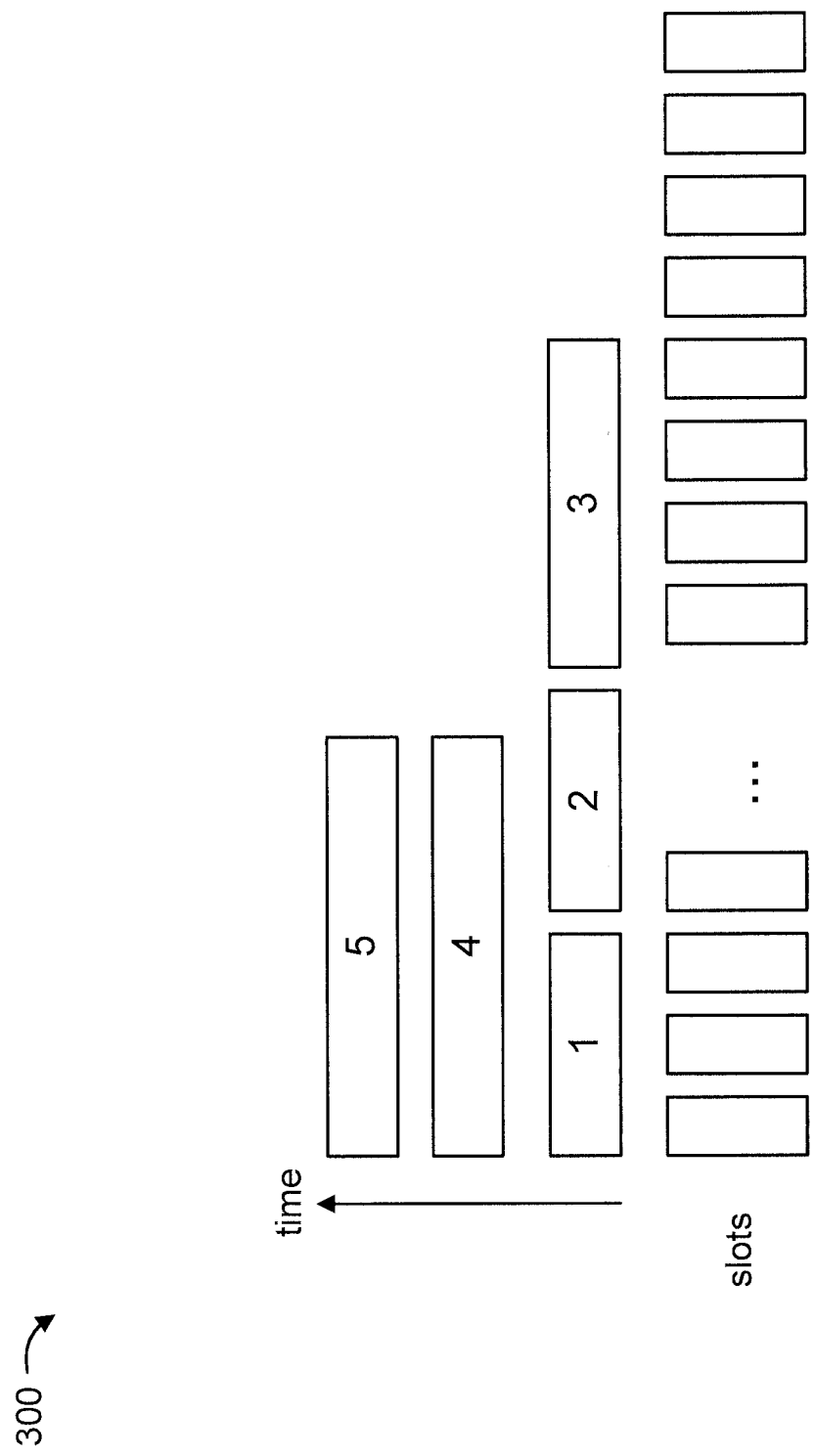
FIG. 3 is a block diagram showing an exemplary case where there are enough memory slots in a buffer cache to store all of the intermediate data for the tasks included in the vertices of the DAG of FIG. 2, in accordance with an embodiment of the present invention.

FIG. 3 is a block diagram showing an exemplary case 300 where there are enough memory slots in a buffer cache to store all of the intermediate data for the tasks included in the vertices (1-5) of the DAG 200 of FIG. 2, in accordance with an embodiment of the present invention.

In case 300, time is shown along the vertical axis, with a storing order for the intermediate data for the tasks for vertices 1-5 being as follows: vertices 1-3; vertex 4; and vertex 5. In case 300, eviction from the buffer cache is not needed in order to process all of the intermediate data for all of the vertices (1-5).

Figure 4:
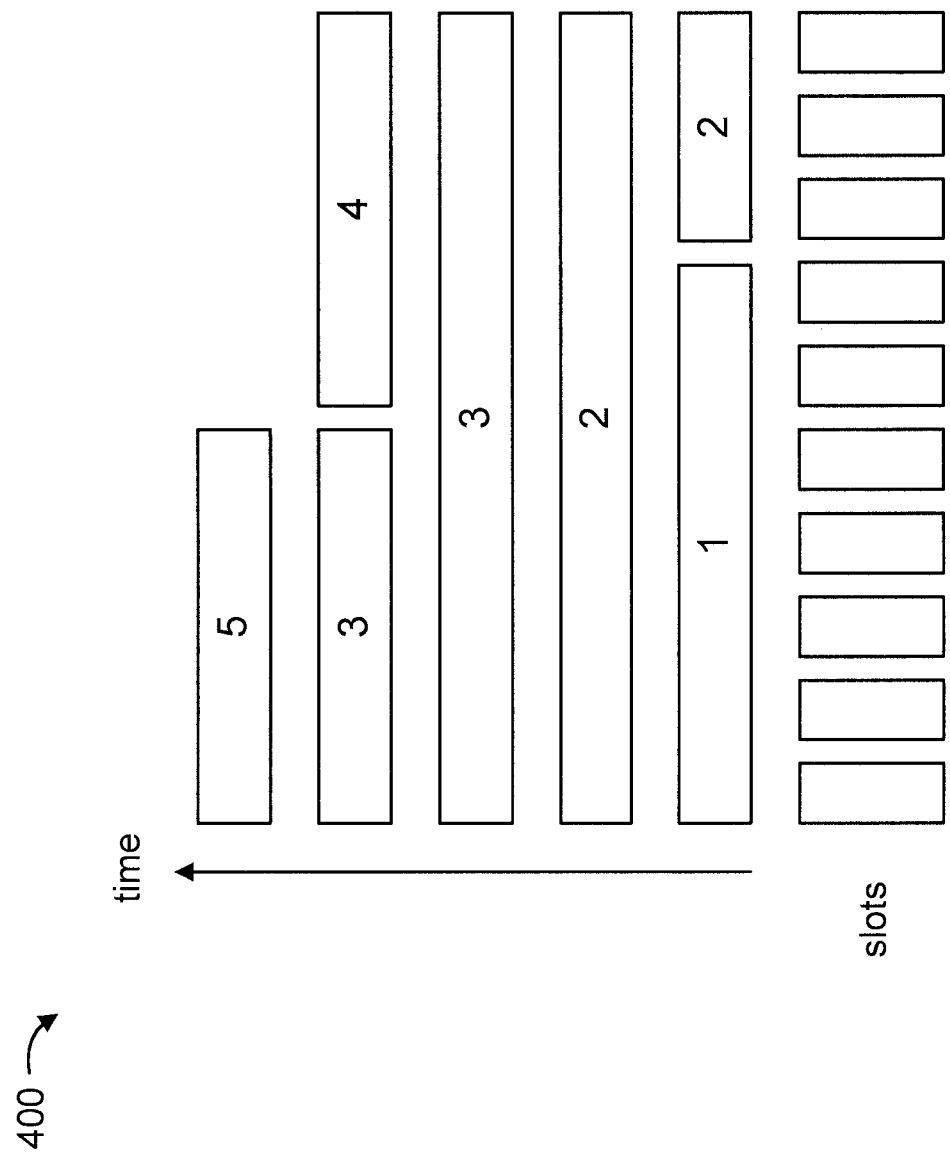
FIG. 4 is a block diagram showing an exemplary case where there is a lack of enough memory slots in a buffer cache to store all of the intermediate data for the tasks included in the vertices of the DAG of FIG. 2, in accordance with an embodiment of the present invention.

FIG. 4 is a block diagram showing an exemplary case 400 where there is a lack of enough memory slots in a buffer cache to store all of the intermediate data for the tasks included in the vertices (1-5) of the DAG 200 of FIG. 2, in accordance with an embodiment of the present invention.

In case 400, time is shown along the vertical axis, with a storing order for the intermediate data for the tasks for vertices 1-5 being as follows: vertices 1-2; vertex 2; vertex 3; vertices 3-4; and vertex 5. In case 400, eviction of the intermediate data for vertices 1-2 is needed in order to process all of the intermediate data for all of the vertices (1-5).

In case 400, the loaded intermediate data for vertex 3 is too big for the available memory capacity, requiring the past loaded intermediate data for one or more other vertices (e.g., vertices 1 and 2) to be evicted from the buffer cache. As a result, the intermediate data has to again be loaded from persistent storage when starting (processing a task for) a dependent vertex (e.g., vertex 4 which depends on vertices 1 and 2).

Figure 5:
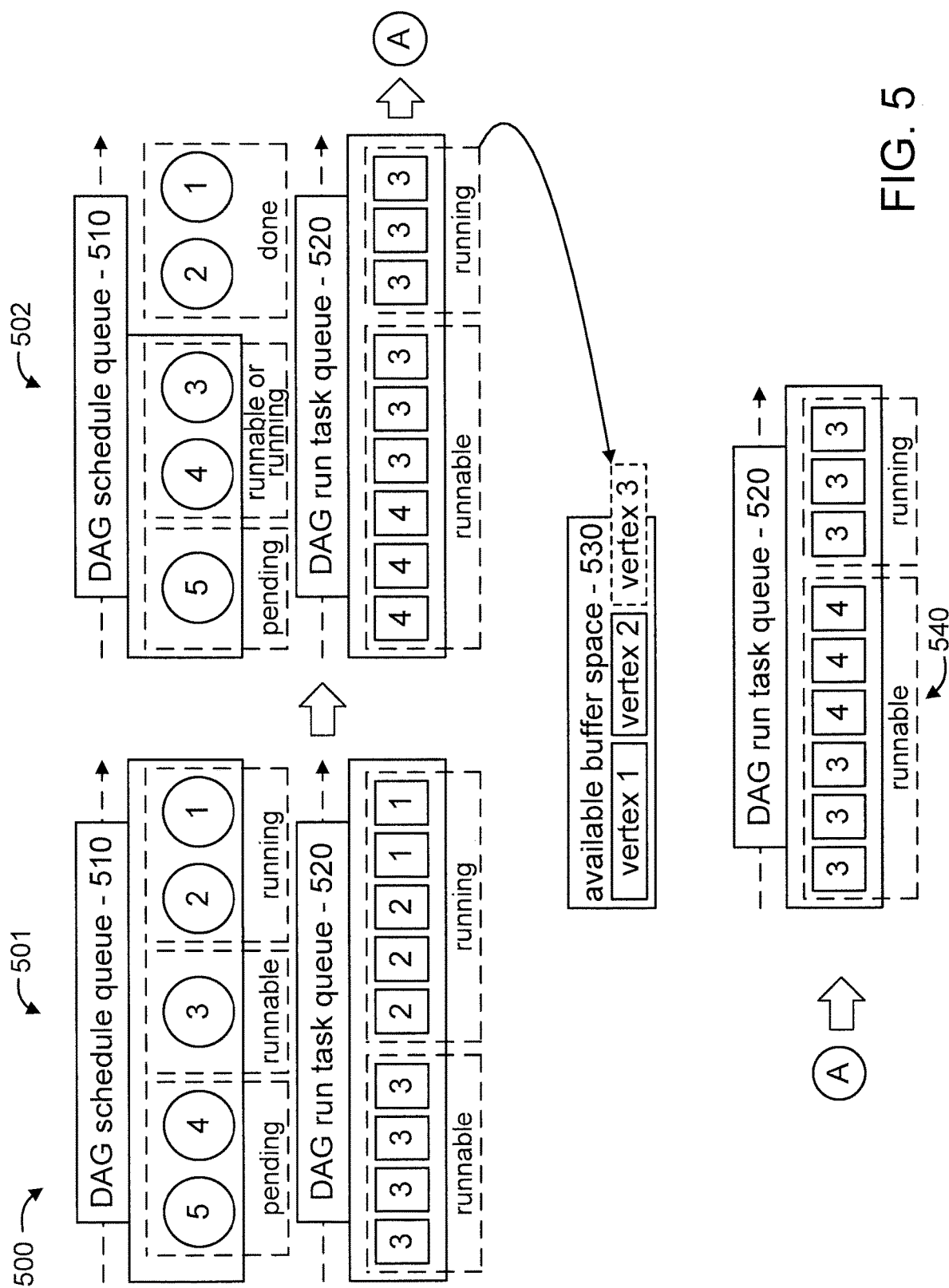
FIG. 5 is a high-level block diagram showing an exemplary processing of the vertices of the DAG of FIG. 2, in accordance with an embodiment of the present invention.

FIG. 5 is a high-level block diagram showing an exemplary processing of the vertices (1-5) of the DAG 200 of FIG. 2, in accordance with an embodiment of the present invention.

At a first timepoint 501, a DAG schedule queue 510 has vertices 1-2 tagged as running, vertex 3 tagged as runnable, and vertices 4-5 tagged as pending. Moreover, at first time point 501, a DAG run task queue 520 has vertices 1-2 tagged as running, and vertex 3 tagged as runnable.

After finishing vertices 1-2 post first timepoint 501, vertex 4 is tagged as runnable (as shown with respect to second timepoint 502).

At a second timepoint 502, the DAG schedule queue 510 has vertices 1-2 tagged as done, vertices 3-4 tagged as running or runnable, and vertex 5 tagged as pending. Moreover, at second time point 502, the DAG run task queue 520 has vertex 3 tagged as running, and vertices 3-4 tagged as runnable. It is noted that some of the tasks for vertex 3 is running, while other tasks for vertex 3 are runnable, hence the two designations in DAG run task queue 520.

From the tag designations for DAG run task queue 520, the total amount of buffer cache usage is estimated, as shown in relation to available buffer space 530 in the buffer cache.

In response to the estimate of the total amount of buffer cache usage, the priorities of tasks are changed for the new runnable vertex, as shown in relation to modified tag designations 540 for the DAG run task queue 520.

FIG. 6 is a flow diagram showing a method 600 for data loading for improving memory cache hit ratio in a DAG-based computational system, in accordance with an embodiment of the present invention.

At block 610, track buffer cache usage in each finished vertex and available free buffer cache space.

At block 620, responsive to a new vertex being tagged as a runnable vertex, check whether the new vertex has dependent parent vertexes. If so, then proceed to block 630. Otherwise, proceed to block 670. Referring to the example DAG 200 shown in FIG. 2, vertex 4 can be considered as the new vertex tagged as runnable and vertex 3 can be considered as a current running vertex (see also, FIG. 5, time point 502).

At block 630, dynamically estimate the total buffer cache usage of a current running vertex (e.g., vertex 3) from a piece of result (partial result) of current running tasks (i.e., tasks of vertex 3).

At block 640, check whether the expected total buffer cache usage of the current running vertex exceeds the available space in the buffer cache (i.e., existing cache of parents' vertexes would be evicted from memory in the absence of the present invention and the following steps). If so, then proceed to block 650. Otherwise, proceed to block 670.

At block 650, select a vertex from runnable vertexes whose parent vertex's data is most cached in buffer cache (relative to other parent vertex's data), and increase a priority of tasks of the selected vertex in (the runnable portion of) the run tasks queue. As used herein, "most cached" means having the most amount of data cached in the buffer cache relative to the other runnable vertices.

At block 660, execute the tasks in the selected vertex earlier than other remaining runnable tasks whose parent's vertex data is few or not cached in the buffer cache.

At block 670, execute the tasks in the original order. As can appreciated by one of ordinary skill in the art, execution of the tasks in the original order will likely require an eviction of at least some of the intermediate data and reloading that intermediate data from RAM.

FIG. 7 is a flow diagram showing an exemplary method 700 for estimating a total amount of buffer cache usage of a current running vertex based on a fragmented (partial) task result, in accordance with an embodiment of the present invention.

At block 710, determine the (amount of) used buffer cache.

At block 720, determine the (amount of) used buffer cache per task.

At block 730, determine a number of remaining tasks.

At block 740, estimate the total amount of buffer cache usage, $C_i$, as follows:

$$C_i = (\text{used buffer cache}) + (\text{used buffer cache per task}) \times (\text{\# of remaining tasks}),$$

where i is the vertex id.

A description will now be given regarding various performance aspects relating to the present invention, in accordance with an embodiment of the present invention.

In an embodiment, the present invention was implemented in a re-ordering scheme in a Spark DAG Scheduler. Response time was evaluated with a shuffle heavy multiple stage join query. It is to be appreciated that optimized Spark achieved a 20% faster result than vanilla Spark.

A description will now be given regarding various advantages of the present invention, in accordance with an embodiment of the present invention.

One advantage of the present invention is that is can utilize limited resources as much as possible. For example, the present invention can be configured for deployment/fitting in a container and/or cloud environment.

As another advantage, the present invention is also applicable to other DAG computational systems such as Tez® and so forth, as readily appreciated by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
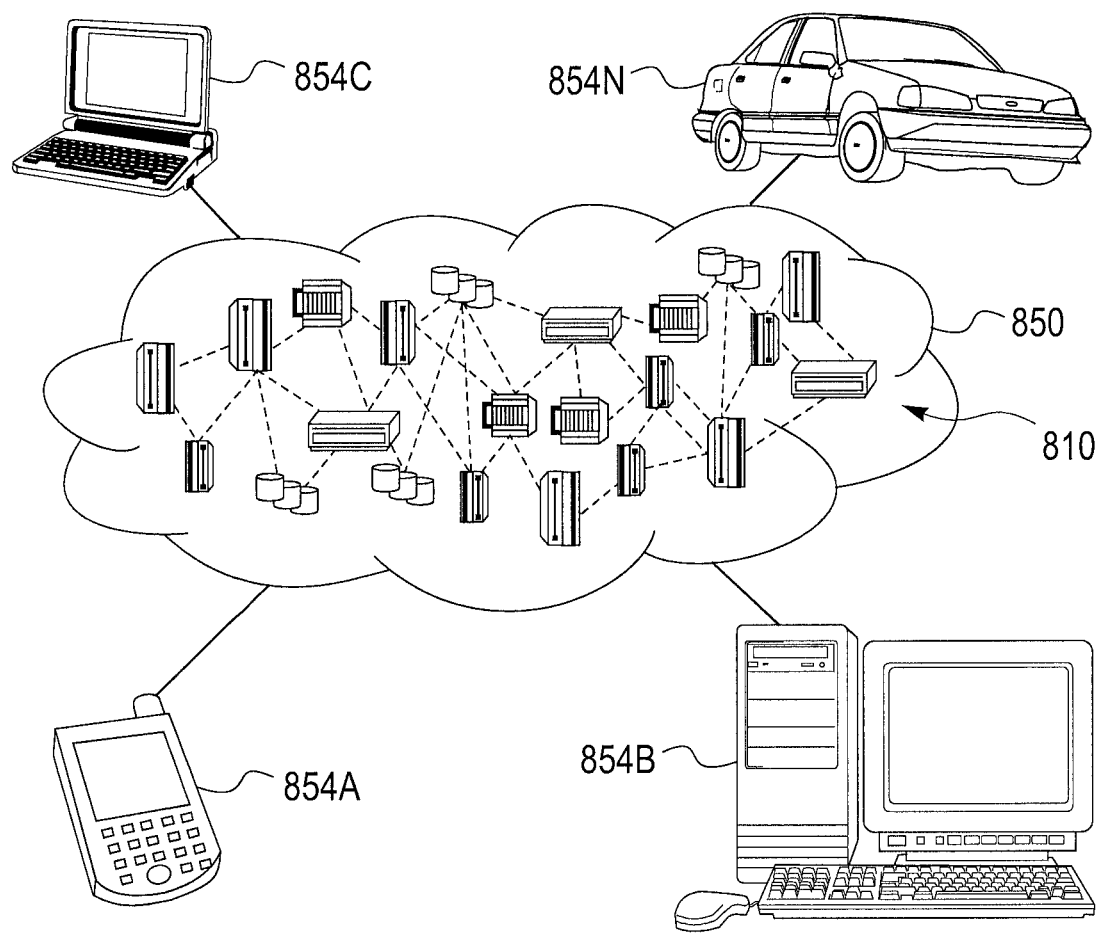
FIG. 8 is a block diagram showing an illustrative cloud computing environment having one or more cloud computing nodes with which local computing devices used by cloud consumers communicate in accordance with one embodiment.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
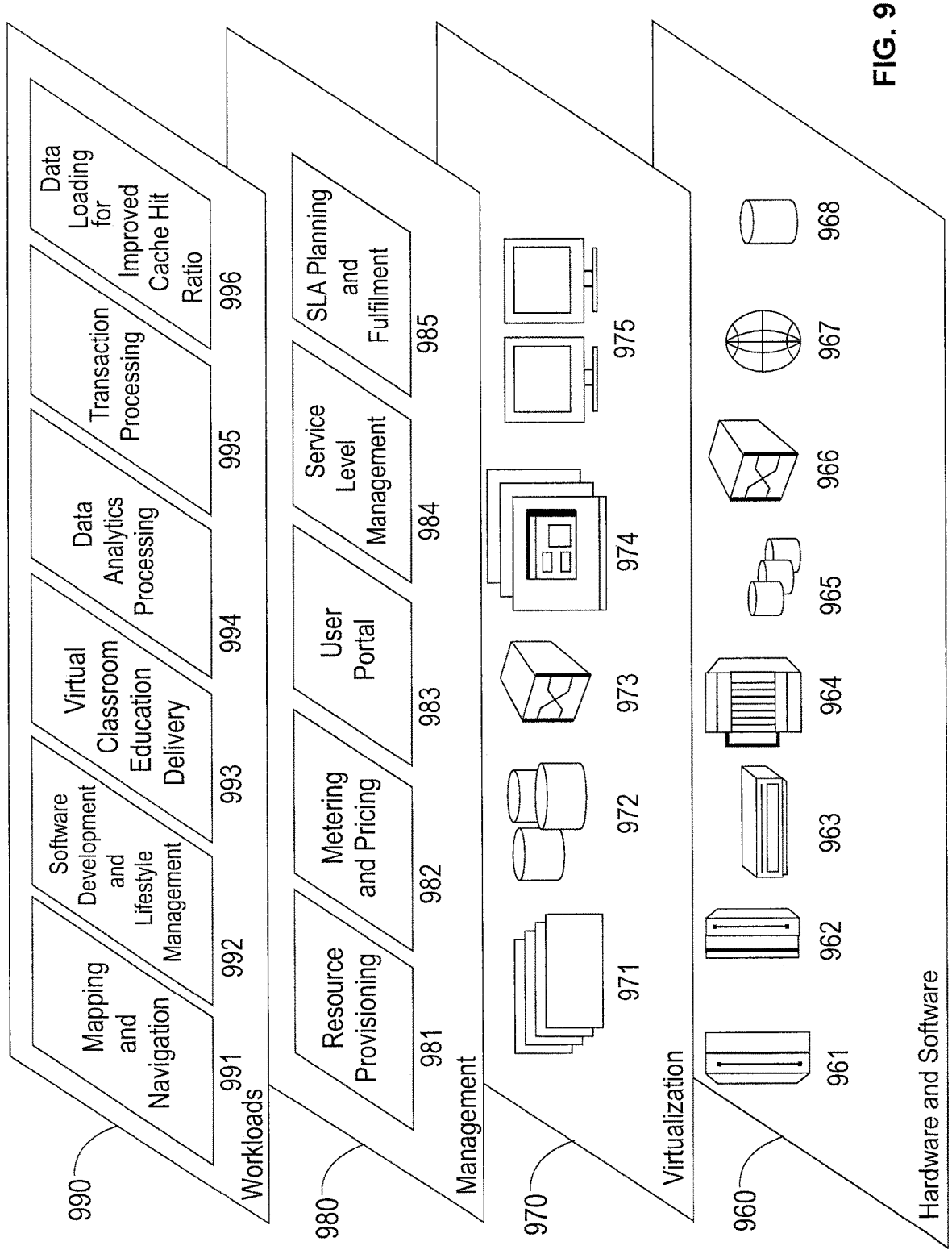
FIG. 9 is a block diagram showing a set of functional abstraction layers provided by a cloud computing environment in accordance with one embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and data loading for improving memory cache hit ratio in DAG-based computational system 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for improving a hit ratio of a buffer cache in a Directed Acyclic Graph (DAG)-based computation system in which vertices of a DAG have tasks that generate intermediate data stored in the buffer cache, the method comprising:
   tracking (i) a buffer cache usage by the vertices that have finished running and (ii) a current available buffer cache space;
   responsive to a new one of the tasks being tagged as runnable, checking whether the new one of the tasks has one or more dependent parent vertices;
   responsive to the new one of the tasks having the one or more dependent parent vertices, generating an estimate of a total buffer cache usage of any current running ones of the vertices based on a partial result of the current running ones of the vertices;
   responsive to the estimate being greater than the current available buffer cache space, (i) selecting a vertex, from the current running vertices, that has a most amount of intermediate data stored in the buffer cache for its one or more dependent parent vertices, and (ii) increasing a priority of the tasks in the selected vertex that are in a run tasks queue to obtain prioritized tasks; and
   executing, by a processor of the DAG-based computation system, the prioritized tasks in the selected vertex earlier than other remaining runnable tasks having an amount of the intermediate data stored in the buffer cache being less than that of the selected vertex and less than a threshold amount.

2. The computer-implemented method of claim 1, wherein the partial result of the current running ones of the vertices corresponds to a partial amount of the intermediate data generated by the current running ones of the vertices.

3. The computer-implemented method of claim 1, wherein the total buffer cache usage is estimated as follows:
   determining an amount of used buffer cache;
   determining an amount of used buffer cache per task; and
   determining a number of remaining tasks,
   wherein the estimate Ci is calculated as follows:

$Ci$=(the amount of used buffer cache)+(the amount of used buffer cache per task)×(the number of remaining tasks), where $i$ is the vertex id.

4. The computer-implemented method of claim 1, wherein the priority is increased to replace a data eviction step relative to the buffer cache.

5. The computer-implemented method of claim 1, wherein the priority is increased to change a runnable task level execution order for at least one of the tasks in one or more independent vertices of the DAG.

6. The computer-implemented method of claim 1, wherein the priority is increased so as to postpone execution of at least one of the tasks in one or more independent vertices of the DAG.

7. The computer-implemented method of claim 1, wherein each of the vertices comprises a respective plurality of tasks.

8. A computer program product for improving a hit ratio of a buffer cache in a Directed Acyclic Graph (DAG)-based computation system in which vertices of a DAG have tasks that generate intermediate data stored in the buffer cache, the computer program product comprising a computer readable storage medium having program instructions embodied therewith, the program instructions executable by the DAG-based computation system to cause the DAG-based computation system to perform a method comprising:
   tracking (i) a buffer cache usage by the vertices that have finished running and (ii) a current available buffer cache space;
   responsive to a new one of the tasks being tagged as runnable, checking whether the new one of the tasks has one or more dependent parent vertices;
   responsive to the new one of the tasks having the one or more dependent parent vertices, generating an estimate of a total buffer cache usage of any current running ones of the vertices based on a partial result of the current running ones of the vertices;
   responsive to the estimate being greater than the current available buffer cache space, (i) selecting a vertex, from the current running vertices, that has a most amount of intermediate data stored in the buffer cache for its one or more dependent parent vertices, and (ii) increasing a priority of the tasks in the selected vertex that are in a run tasks queue to obtain prioritized tasks; and
   executing, by a processor of the DAG-based computation system, the prioritized tasks in the selected vertex earlier than other remaining runnable tasks having an amount of the intermediate data stored in the buffer cache being less than that of the selected vertex and less than a threshold amount.

9. The computer program product of claim 8, wherein the partial result of the current running ones of the vertices corresponds to a partial amount of the intermediate data generated by the current running ones of the vertices.

10. The computer program product of claim 8, wherein the total buffer cache usage is estimated as follows:
    determining an amount of used buffer cache;
    determining an amount of used buffer cache per task; and
    determining a number of remaining tasks,
    wherein the estimate Ci is calculated as follows:

$Ci$=(the amount of used buffer cache)+(the amount of used buffer cache per task)×(the number of remaining tasks), where $i$ is the vertex id.

11. The computer program product of claim 8, wherein the priority is increased to replace a data eviction step relative to the buffer cache.

12. The computer program product of claim 8, wherein the priority is increased to change a runnable task level execution order for at least one of the tasks in one or more independent vertices of the DAG.

13. The computer program product of claim 8, wherein the priority is increased so as to postpone execution of at least one of the tasks in one or more independent vertices of the DAG.

14. The computer program product of claim 8, wherein each of the vertices comprises a respective plurality of tasks.

15. A Directed Acyclic Graph (DAG)-based computation system, comprising:
    a memory for storing a DAG having vertices that include tasks that generate intermediate data;
    a buffer cache for storing the intermediate data; and
    a processor, operatively coupled to the memory and the buffer cache, running program code to:
       track (i) a buffer cache usage by the vertices that have finished running and (ii) a current available buffer cache space;

responsive to a new one of the tasks being tagged as runnable, check whether the new one of the tasks has one or more dependent parent vertices;

responsive to the new one of the tasks having the one or more dependent parent vertices, generate an estimate of a total buffer cache usage of any current running ones of the vertices based on a partial result of the current running ones of the vertices;

responsive to the estimate being greater than the current available buffer cache space, (i) select a vertex, from the current running vertices, that has a most amount of intermediate data stored in the buffer cache for its one or more dependent parent vertices, and (ii) increase a priority of the tasks in the selected vertex that are in a run tasks queue to obtain prioritized tasks; and execute the prioritized tasks in the selected vertex earlier than other remaining runnable tasks having an amount of the intermediate data stored in the buffer cache being less than that of the selected vertex and less than a threshold amount.

16. The DAG-based computation system of claim 15, wherein the partial result of the current running ones of the vertices corresponds to a partial amount of the intermediate data generated by the current running ones of the vertices.

17. The DAG-based computation system of claim 15, wherein the total buffer cache usage is estimated as follows:
determining an amount of used buffer cache;
determining an amount of used buffer cache per task; and
determining a number of remaining tasks,
wherein the estimate Ci is calculated as follows:

$Ci$=(the amount of used buffer cache)+(the amount of used buffer cache per task)×(the number of remaining tasks), where $i$ is the vertex id.

18. The DAG-based computation system of claim 15, wherein the priority is increased to replace a data eviction step relative to the buffer cache.

19. The DAG-based computation system of claim 15, wherein the priority is increased to change a runnable task level execution order for at least one of the tasks in one or more independent vertices of the DAG.

20. The DAG-based computation system of claim 15, wherein the priority is increased so as to postpone execution of at least one of the tasks in one or more independent vertices of the DAG.

* * * * *